(12) United States Patent
Zeng et al.

(10) Patent No.: US 11,387,880 B2
(45) Date of Patent: Jul. 12, 2022

(54) CHANNEL STATE INFORMATION FEEDBACK USING CHANNEL COMPRESSION AND RECONSTRUCTION

(71) Applicant: QUALCOMM Incorporated, San Diego, CA (US)

(72) Inventors: Weiliang Zeng, San Diego, CA (US); Taesang Yoo, San Diego, CA (US); Sanaz Barghi, Carlsbad, CA (US); Naga Bhushan, San Diego, CA (US); Pavan Kumar Vitthaladevuni, San Diego, CA (US); Krishna Kiran Mukkavilli, San Diego, CA (US); Xiaoxia Zhang, San Diego, CA (US); Tingfang Ji, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/804,828

(22) Filed: Feb. 28, 2020

(65) Prior Publication Data

US 2021/0273706 A1 Sep. 2, 2021

(51) Int. Cl.

| | |
|---|---|
| *H04B 7/06* | (2006.01) |
| *H04B 7/0417* | (2017.01) |
| *H04B 7/0456* | (2017.01) |
| *H04L 1/00* | (2006.01) |
| *H04L 5/00* | (2006.01) |

(52) U.S. Cl.
CPC ......... *H04B 7/0626* (2013.01); *H04B 7/0417* (2013.01); *H04B 7/0486* (2013.01); *H04L 1/0003* (2013.01); *H04L 5/0051* (2013.01)

(58) Field of Classification Search
CPC .. H04B 7/0417; H04B 7/0486; H04B 7/0626; H04L 1/0003; H04L 5/0048;
(Continued)

(56) References Cited

U.S. PATENT DOCUMENTS

| | | |
|---|---|---|
| 10,110,290 B2 | 10/2018 | Kim et al. |
| 10,305,553 B2 | 5/2019 | O'Shea et al. |

(Continued)

FOREIGN PATENT DOCUMENTS

| | | |
|---|---|---|
| CN | 108847876 A | 11/2018 |
| WO | WO-2019080987 A1 | 5/2019 |

(Continued)

OTHER PUBLICATIONS

Liu et al., "An Efficient Deep Learning Framework for Low Rate Massive MIMO CSI Reporting", Dec. 23, 2019, arXiv.org, Computer Science > Information Theory, arXiv:1912.10608 [cs.IT], pp. 1-26 (Year: 2019).*

(Continued)

*Primary Examiner* — Michael K Phillips
(74) *Attorney, Agent, or Firm* — QUALCOMM Incorporated

(57) ABSTRACT

Systems and methods facilitating feedback of robust channel state information (CSI), such as to provide full CSI feedback or otherwise providing CSI feedback, are described. CSI encoders and/or decoders used by network nodes may implement channel compression/reconstruction based upon neural-network (NN) training of collected channels. A structured payload having an interpretable payload portion and an uninterpretable payload portion may utilized with respect to CSI feedback. The channel compression provided according to some aspects of the disclosure supports feedback of robust CSI, in some instances including full CSI, as determined by a particular network node. Other aspects and features are also claimed and described.

30 Claims, 7 Drawing Sheets

(58) Field of Classification Search
CPC ... H04L 5/0051; H04L 5/0057; H04L 1/0026; H04L 1/003; H04L 1/0036; H04L 1/0029; G06N 3/088; G06N 3/0454
See application file for complete search history.

(56) References Cited

U.S. PATENT DOCUMENTS

| | | | | |
|---|---|---|---|---|
| 2012/0275376 | A1* | 11/2012 | Sampath | H04B 7/0632 370/328 |
| 2018/0175993 | A1* | 6/2018 | Onggosanusi | H04B 7/0486 |
| 2018/0367192 | A1* | 12/2018 | O'Shea | H04B 7/0413 |
| 2020/0220598 | A1* | 7/2020 | Zhang | H04B 7/0632 |
| 2021/0195462 | A1* | 6/2021 | Pezeshki | H04W 80/02 |

FOREIGN PATENT DOCUMENTS

| | | | | |
|---|---|---|---|---|
| WO | WO-2019192009 | A1 | 10/2019 | |
| WO | WO-2019192527 | A1 * | 10/2019 | .......... H04B 7/0456 |
| WO | WO-2019237344 | A1 | 12/2019 | |
| WO | WO-2020122793 | A1 * | 6/2020 | .......... H04B 7/0645 |
| WO | WO-2021107829 | A1 * | 6/2021 | .......... H04B 7/024 |
| WO | WO-2021142605 | A1 * | 7/2021 | .......... H04B 7/06 |

OTHER PUBLICATIONS

International Search Report and Written Opinion—PCT/US2021/017896—ISA/EPO—dated May 20, 2021.
Liao Y., et al., "CSI Feedback Based on Deep Learning for Massive MIMO Systems", IEEE Access, vol. 7, Jun. 24, 2019 (Jun. 24, 2019), XP011734696, p. 86810-86820, DOI: 10.1109/ACCESS.2019.2924673 [retrieved on Jul. 12, 2019] abstract, sections 2, 3.
Lu C., et al., "MIMO Channel Information Feedback Using Deep Recurrent Network", IEEE Communications Letters, IEEE Service Center, Piscataway, NJ, US, vol. 23, No. 1, Jan. 1, 2019 (Jan. 1, 2019), XP011696277, pp. 188-191, , ISSN: 1089-7798, DOI: 10.1109/LCOMM.2018.2882829 [retrieved on Jan. 7, 2019] abstract, sections 2, 3, figures 1-3.

* cited by examiner

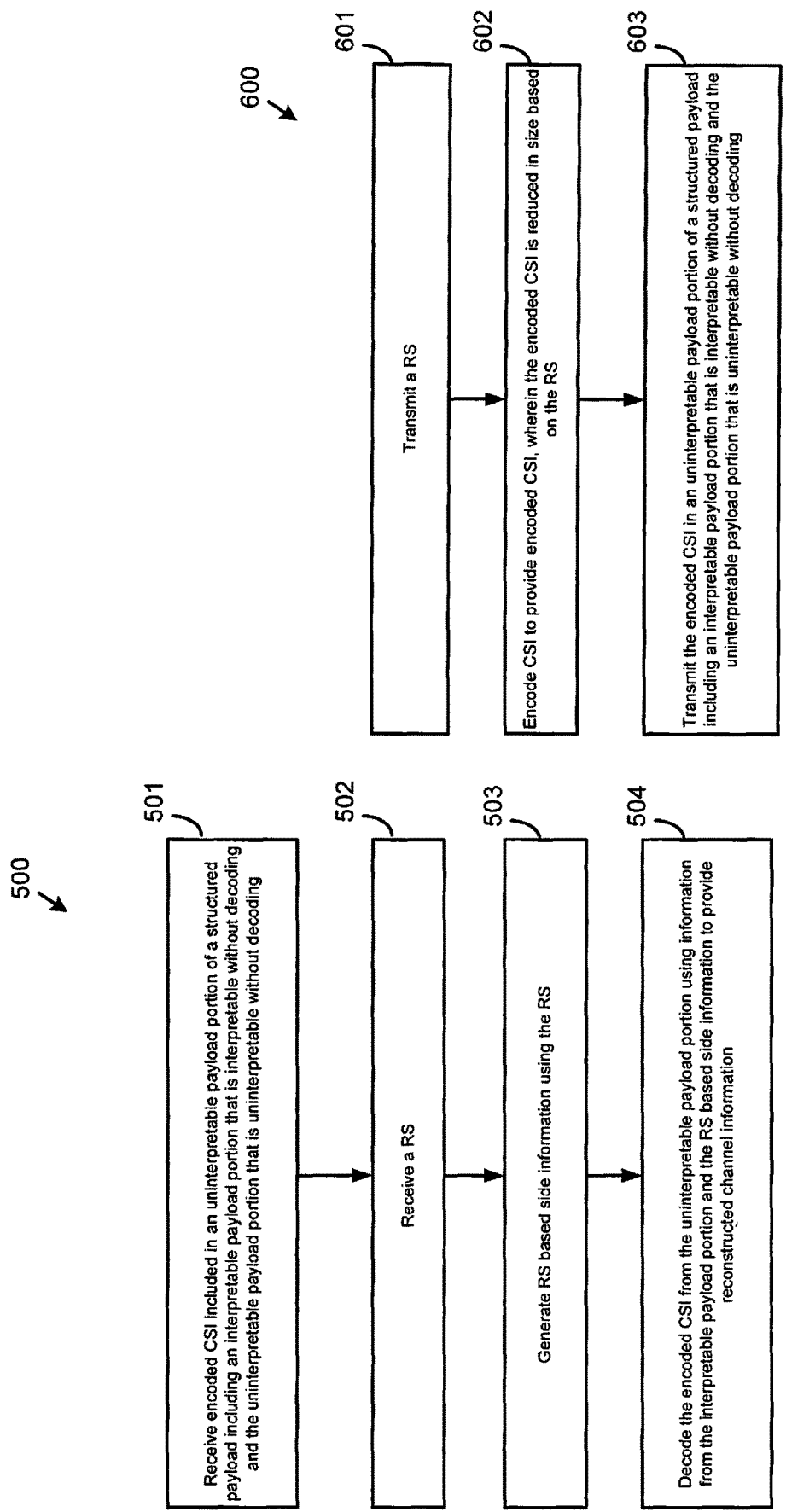

CHANNEL STATE INFORMATION FEEDBACK USING CHANNEL COMPRESSION AND RECONSTRUCTION

TECHNICAL FIELD

Aspects of the present disclosure relate generally to wireless communication systems, and more particularly, to channel state information feedback. Certain embodiments of the technology discussed below can enable and provide channel state information feedback using channel compression and reconstruction.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Channel state information (CSI) feedback may be used to address interference and enhance system performance. For example, CSI provided by a UE can be used by a base station for beamforming, nulling, link adaptation, rank selection, etc. to remediate interference and/or other issues in the communication channel which may otherwise substantially degrade performance. Existing methods for feedback of CSI may be based on quantized feedback. For example, a UE may provide preferred rank indicator (RI), precoding matrix indicator (PMI), channel quality indicator (CQI), etc. by evaluating different options. Evaluating the various options, however, can be compute-intensive. Moreover, PMI codebooks are heavily structured and reported for a given granularity (e.g., wide-band or sub-band).

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include receiving, by a first network node from a second network node, encoded channel state information (CSI). The CSI may be included in a structured payload. The structured payload may include various portions, such as an interpretable payload portion that is interpretable (e.g., without decoding) and an uninterpretable payload portion that is uninterpretable (e.g., without decoding). The encoded CSI may be included in the uninterpretable payload portion of the structured payload. A method may also include receiving, by the first network node from the second network node, a reference signal (RS). A method may also include generating, by the first network node, RS based side information (e.g., based on and/or using the RS). The RS based side information may be information in addition to the CSI that is configured for use in association with the CSI. A method may further include decoding, by the first network node, the encoded CSI (e.g., from the uninterpretable payload portion) using information from the interpretable payload portion and the RS based side information to provide reconstructed channel information.

In an additional aspect of the disclosure, an apparatus for wireless communication is provided. An apparatus may include means for receiving, by a first network node from a second network node, encoded CSI. The CSI may be included in a structured payload. The Structured payload may include various portions, such as an interpretable payload portion that is interpretable (e.g., without decoding) and an uninterpretable payload portion that is uninterpretable (e.g., without decoding). The encoded CSI may be included in the uninterpretable payload portion of the structured payload. An apparatus may also include means for receiving, by the first network node from the second network node, a RS. An apparatus may also include means for generating, by the first network node, RS based side information (e.g., based on and/or using the RS). The RS based side information may be information in addition to the CSI that is configured for use in association with the CSI. An apparatus may further include means for decoding, by the first network node, the encoded CSI (e.g., from the uninterpretable payload portion) using information from the interpretable payload portion and the RS based side information to provide reconstructed channel information.

In an additional aspect of the disclosure, a non-transitory computer-readable medium having program code recorded thereon for wireless communication is provided. The program code may include code to receive, by a first network node from a second network node, encoded CSI. The CSI may be included in a structured payload. The structured payload may include an interpretable payload portion that is interpretable (e.g., without decoding) and an uninterpretable payload portion that is uninterpretable (e.g., without decoding). The encoded CSI may be included in the uninterpretable payload portion of the structured payload. The program code may also include code to receive, by the first network node from the second network node, a RS. The program code may also include code to generate, by the first network node, RS based side information (e.g., based on and/or using the RS). The RS based side information may be information in addition to the CSI that is configured for use in association with the CSI. The program code may further include code to decode, by the first network node, the encoded CSI (e.g., from the uninterpretable payload portion) using information from the interpretable payload portion and the RS based side information to provide reconstructed channel information.

In an additional aspect of the disclosure, an apparatus configured for wireless communication is disclosed. The apparatus includes at least one processor, and a memory coupled to the processor. The processor may be configured to receive, by a first network node from a second network node, encoded CSI. The CSI may be included in a structured payload. The structured payload may include an interpretable payload portion that is interpretable (e.g., without decoding) and an uninterpretable payload portion that is uninterpretable (e.g., without decoding). The encoded CSI may be included in the uninterpretable payload portion of the structured payload. The processor may also be configured to receive, by the first network node from the second network node, a RS. The processor may also be configured to generate, by the first network node, RS based side information (e.g., based on and/or using the RS). The RS based side information may be information in addition to the CSI that is configured for use in association with the CSI. The processor may further be configured to decode, by the first network node, the encoded CSI (e.g., from the uninterpretable payload portion) using information from the interpretable payload portion and the RS based side information to provide reconstructed channel information.

In accordance with aspects of the disclosure, the foregoing systems, methods, and apparatuses may be implemented in combination with one or more additional features, such as the following features whether alone or in combination. For example, the above systems, methods, and apparatuses may include signaling, by the first network node to the second network node, to indicate that the structured payload is to be used for feedback of the encoded CSI. The above systems, methods, and apparatuses may include signaling, by the first network node to the second network node, to indicate that the encoded CSI of the uninterpretable payload portion is to be encoded with consideration of the RS based side information. The above systems, methods, and apparatuses may include inputting a RS estimated channel to a neural-network to generate low dimensional information for the RS based side information provided to a CSI decoder decoding the reconstructed channel information from the encoded CSI of the uninterpretable payload portion. The encoded CSI in the uninterpretable payload portion of the above systems, methods, and apparatuses may include size reduced CSI encoded by a CSI encoder using neural-network based channel compression. The encoded CSI in the uninterpretable payload portion of the above systems, methods, and apparatuses may be reduced in size based on the RS based side information. The encoded CSI in the uninterpretable payload portion of the above systems, methods, and apparatuses may include CSI information regarding an estimated channel as observed by the second network node, wherein the CSI information is regarding the estimated channel as observed by the second network node. The interpretable payload portion of the above systems, methods, and apparatuses may include information configured to facilitate early decisions by the first network node with respect to decoding the encoded CSI or utilization of the reconstructed channel information. The information of the interpretable payload portion of the above systems, methods, and apparatuses may include at least one of burst interference information, recommended rank information, modulation and coding scheme (MCS) information, or information regarding which reference signal encoding of the encoded CSI is based upon. The above systems, methods, and apparatuses may include training a CSI decoder configured to perform the decoding of the encoded CSI from the uninterpretable payload portion using an autoencoder framework based on online data collection at the first network node, wherein the online data collection includes CSI information collected from the second network node and reference signal information monitored by the first network node, and wherein the encoded CSI in the uninterpretable payload portion is compressed using encoder parameters derived from the autoencoder framework. The interpretable payload portion and the uninterpretable payload portion of the above systems, methods, and apparatuses may be generated by a CSI encoder, wherein the CSI encoder has been trained using the autoencoder framework used in training the CSI decoder. The uninterpretable payload portion of the above systems, methods, and apparatuses may be generated by a CSI encoder and the interpretable payload portion is added to the structured payload after encoding of the uninterpretable payload portion by the CSI encoder.

In one aspect of the disclosure, a method of wireless communication is provided. A method may include transmitting, by a first network node, a RS. A method may also include encoding, by the first network node, CSI to provide encoded CSI. The encoded CSI may be based at least partially on the RS. A method may further include transmitting, by the first network node to a second network node, the encoded CSI using a structured payload. The structured payload may include various portions, such as an interpretable payload portion that is interpretable (e.g., without decoding) and an uninterpretable payload portion that is uninterpretable (e.g., without decoding). The encoded CSI may be included in the uninterpretable payload portion of the structured payload.

In an additional aspect of the disclosure, an apparatus for wireless communication is provided. An apparatus may include means for transmitting, by a first network node, a RS. An apparatus may also include means for encoding, by the first network node, CSI to provide encoded CSI. The encoded CSI may be based at least partially on the RS. An apparatus may further include means for transmitting, by the first network node to a second network node, the encoded CSI using a structured payload. The structured payload may include various portions, such as an interpretable payload portion that is interpretable (e.g., without decoding) and an uninterpretable payload portion that is uninterpretable (e.g., without decoding). The encoded CSI may be included in the uninterpretable payload portion of the structured payload.

In an additional aspect of the disclosure, a non-transitory computer-readable medium having program code recorded thereon for wireless communication is provided. The program code may include code to transmit, by a first network node, a RS. The program code may also include code to encode, by the first network node, CSI to provide encoded CSI. The encoded CSI may be based at least partially on the RS. The program code may further include code to transmit, by the first network node to a second network node, the encoded CSI using a structured payload. The structured payload may include various portions, such as an interpretable payload portion that is interpretable (e.g., without decoding) and an uninterpretable payload portion that is uninterpretable (e.g., without decoding). The encoded CSI may be included in the uninterpretable payload portion of the structured payload.

In an additional aspect of the disclosure, an apparatus configured for wireless communication is disclosed. The apparatus includes at least one processor, and a memory coupled to the processor. The processor may be configured to transmit, by a first network node, a RS. The processor may also be configured to encode, by the first network node, CSI to provide encoded CSI. The encoded CSI may be based at least partially on the RS. The processor may further be configured to transmit, by the first network node to a second network node, the encoded CSI using a structured payload. The structured payload may include various portions, such as an interpretable payload portion that is interpretable (e.g., without decoding) and an uninterpretable payload portion that is uninterpretable (e.g., without decoding). The encoded CSI may be included in the uninterpretable payload portion of the structured payload.

In accordance with aspects of the disclosure, the foregoing systems, methods, and apparatuses may be implemented in combination with one or more additional features, such as the following features whether alone or in combination. For example, the above systems, methods, and apparatuses may include receiving, by the first network node from the second network node, an indication that the structured payload is to be used with respect to the encoded CSI. The above systems, methods, and apparatuses may include signaling, by the first network node to the second network node, to indicate that the structured payload is being used for feedback of the encoded CSI. The above systems, methods, and apparatuses may include receiving, by the first network node from the second network node, an indication that the encoded CSI of the uninterpretable payload portion is to be encoded with consideration of the RS based side information. The RS of the above systems, methods, and apparatuses may include a SRS. The encoded CSI in the uninterpretable payload portion of the above systems, methods, and apparatuses may include information compressed by a CSI encoder using neural-network based channel compression. Encoded CSI of the uninterpretable payload portion of the above systems, methods, and apparatuses may include CSI information regarding an estimated channel as observed by the first network node, wherein the CSI information is regarding the estimated channel as observed by the first network node. The interpretable payload portion of the above systems, methods, and apparatuses may include information configured to facilitate early decisions by the second network node with respect to decoding the encoded CSI or utilization of reconstructed channel information obtained by decoding the encoded CSI. The information of the interpretable payload portion of the above systems, methods, and apparatuses may include at least one of burst interference information, recommended rank information, MCS information, or information regarding which reference signal encoding of the encoded CSI is based upon. The above systems, methods, and apparatuses may include training a CSI encoder configured to perform the encoding of the CSI of the uninterpretable payload portion using an autoencoder framework based on online data collected at the first network node, wherein the online data collection includes reference signal observation information and decoder parameters derived from observation of the reference collected from the second network node and CSI reference signal information monitored by the first network node, and wherein the encoded CSI in the uninterpretable payload portion is compressed using encoder parameters derived from the autoencoder framework. Both the interpretable payload portion and the uninterpretable payload portion of the above systems, methods, and apparatuses may be generated by the CSI encoder. The uninterpretable payload portion of the above systems methods, and apparatuses may be generated by the CSI encoder and the interpretable payload portion is added to the structured CSI feedback channel compression after encoding of the uniterpretable payload portion by the CSI encoder.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow diagram showing sample operations with respect to a network node configured to receive CSI encoded payload according to some embodiments of the present disclosure.

FIG. 6 is a flow diagram showing sample operations with respect to a network node configured to transmit CSI encoded payload according to some embodiments of the present disclosure.

DETAILED DESCRIPTION

Figure 1:
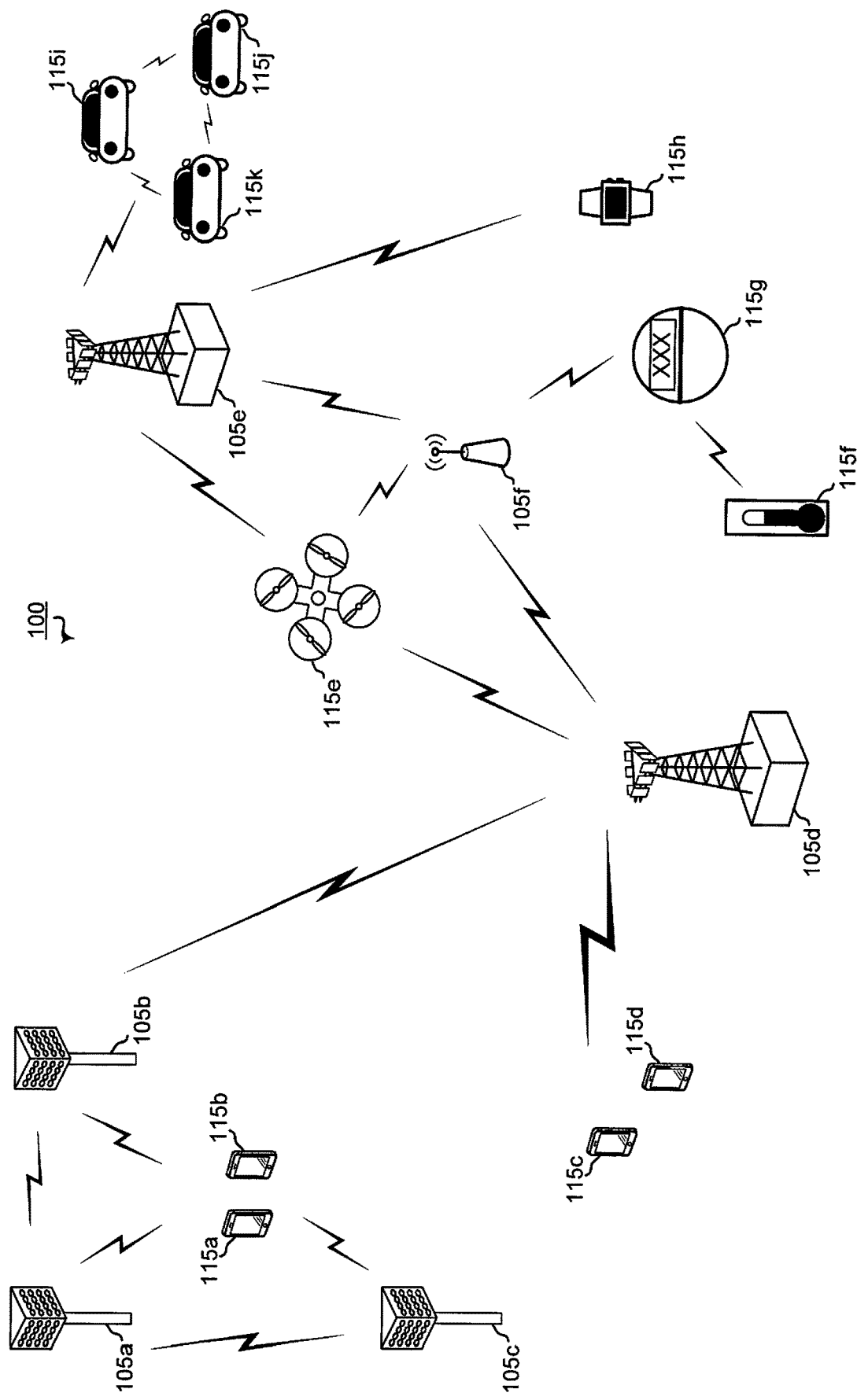
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "5th Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP LTE is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3" Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL)

station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
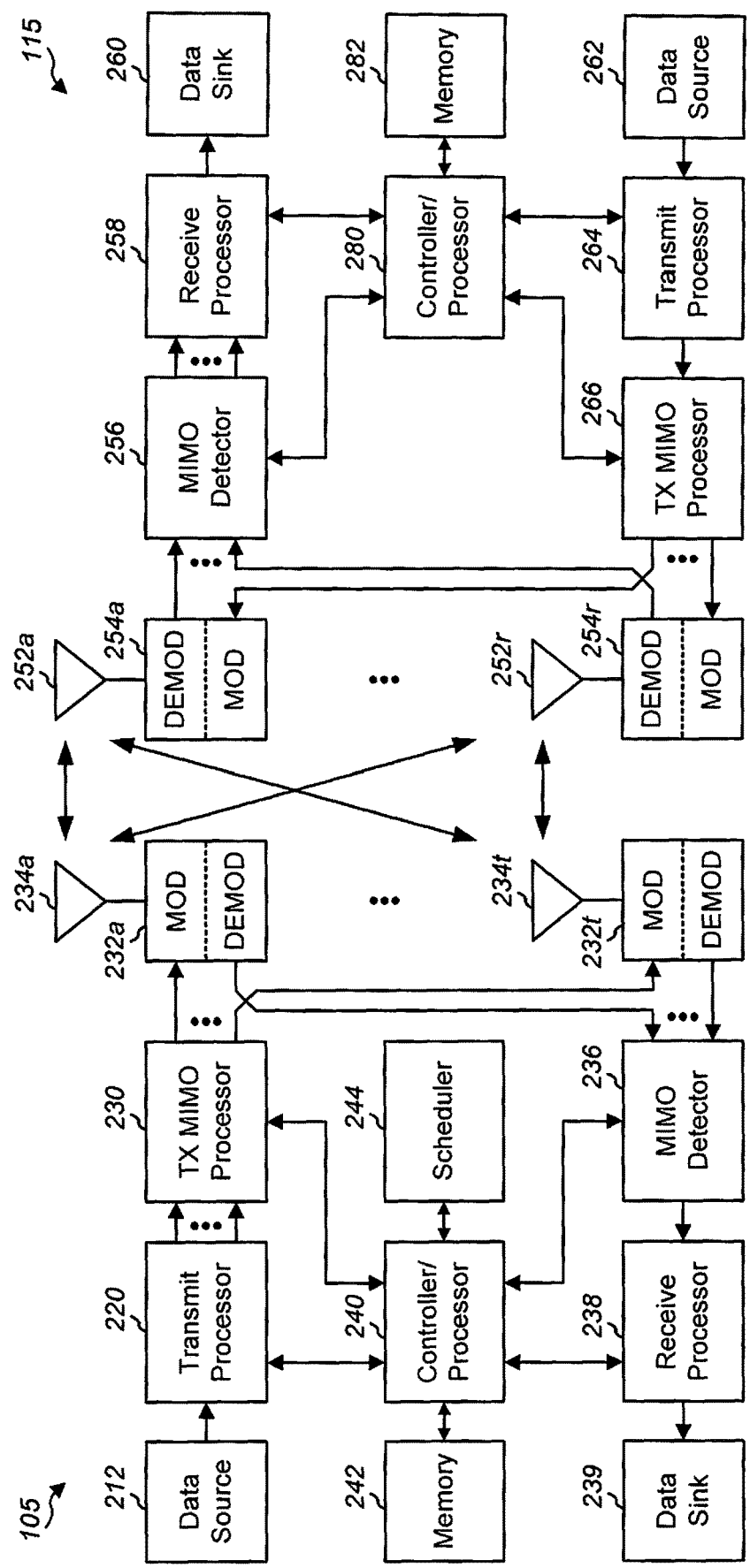
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Despite the use of various techniques for the arbitration of resources among the different network nodes communicating in a wireless network, transmissions may nevertheless be degraded due to channel conditions. For example, terrain, foliage, physical obstacles, cityscape features, etc. may cause fading, multipath, and/or other signal propagation anomalies. Additionally, transmissions may nevertheless encounter interference, such as due to transmissions from neighbor base stations, neighbor UEs, and/or from other wireless radio frequency (RF) transmitters. Embodiments of network nodes (e.g., base stations 105 and UEs 115) of wireless network 100 utilize channel state information (CSI), such as for beamforming, nulling, link adaptation, rank selection, etc., to improve the system performance.

In existing LTE/NR methods, UEs provide feedback of CSI to a base station. The feedback may comprise one or more quantized parameters based upon CSI as observed by the UE rather than full CSI information). For example, a UE may observe a wireless channel, analyze different options regarding rank indicator (RI), precoding matrix indicator (PMI), channel quality indicator (CQI), etc. for the channel as observed by UE, and provide feedback of preferred one or more of these parameters to a base station.

Evaluation of the different options with respect to the observed channel may be compute-intensive. That is, these operations may consume UE processing resources that may otherwise be used for other operations or remain idle to conserve power resources. As one example, a UE may devote large processing resources particularly for NR (e.g., CSI for Type-I single/multi panel and Type-II). Moreover, the limited resources available to the UE and the processing capability available to the UE often lead to the quantized feedback provided by the UE being suboptimal. For example, PMI codebooks are heavily structured and reported by the UE for a given granularity (e.g., wide-band or sub-band), and are known to be suboptimal.

Aspects of the present disclosure facilitate feedback of robust CSI. Aspects can include, providing full CSI feedback or otherwise providing CSI feedback. This feedback may or may not be quantized. In accordance with aspects of the present disclosure, a neural-network (NN) based technique may be utilized. NN techniques may be used for facilitating one or more aspect of channel compression and/or reconstruction techniques. For example, CSI encoders and decoders used by network nodes may implement channel compression/reconstruction based upon NN training of collected channels. In some scenarios, NN-based compression and reconstruction may be optimized for a channel or otherwise tailored for real-world, dynamic channel conditions. A network node may, according to aspects of the disclosure, use a CSI encoder (e.g., implementing NN based encoder weights and/or other parameters) to provide channel compression. In some aspects, channel compression may yield CSI feedback that is carried as a size reduced payload relative to non-compressed CSI feedback. The channel compression provided according to some aspects of the disclosure supports feedback of robust CSI, in some instances including full CSI as observed by a particular network node (e.g., UE).

In operation according to embodiments, a structured payload is utilized for facilitating feedback of CSI using channel compression techniques in accordance with concepts of the present disclosure. A structured payload of embodiments may be structured in that the payload includes multiple pre-defined portions configured for carrying differently configured payload. For example, a structured payload of embodiments can include an interpretable portion and an uninterpretable portion. The interpretable portion can be interpreted without decoding corresponding to a compression encoding implemented by a CSI encoder. The uninterpretable payload portion can be uninterpretable without decoding corresponding to a compression encoding implemented by the CSI encoder. The uninterpretable payload portion of the structured payload may be utilized to carry a size reduced CSI encoded payload (e.g., full or partial CSI information encoded so as to be size reduced relative to non-compressed CSI feedback). The interpretable payload portion of the structured payload may be utilized to carry information for use by a CSI decoder. The CSI decoder can use information from the interpretable payload portion to reduce reconstruction time with respect to the CSI of the uninterpretable payload portion and/or to make early decisions by a network node receiving the CSI feedback. In accordance with aspects of the disclosure, signaling may be used to indicate that structured payload is to be utilized with respect to CSI feedback.

A CSI decoder may utilize side information according to aspects of the disclosure for facilitating channel reconstruction. Side information is information in addition to CSI feedback that is configured for use in association with the CSI feedback, such as to supplement or complete CSI of the CSI feedback. In some deployments, information regarding one or more RSs (e.g., a sounding reference signal (SRS) transmitted by a corresponding network node providing the CSI feedback and observed by the network node receiving the CSI feedback) may be utilized by a CSI decoder of embodiments in channel reconstruction. RS information that is not completely outdated (or has yet to become stale) and available at a CSI decoder can be used as side information for channel reconstruction. Following this approach, the CSI-encoded payload size can be reduced as compared when this side information is not available. The size reduction degree in various embodiments, being significant in some scenarios. In accordance with aspects of the disclosure, signaling may be utilized to indicate when CSI-encoded payload is to be encoded with or without regard to side information.

In an example of operations, encoder and decoder parameters can be distributed by and/or between UE 115 and base station 105. These parameters may be pre-programed (or stored) in a base station and/or a UE, distributed over the air, generated dynamically, updated during communication operations, or communicated from other network nodes, etc.

Where CSI feedback is provided by a UE to a corresponding base station, the base station may provide signaling to indicate or request that a UE send back or return a payload (e.g., a particular structured compressed payload). The base station may additionally or alternatively provide signaling to indicate or request that the UE encode the CSI to be provided as feedback with or without an assumption that side information (e.g., SRS) is to be used by the base station when recovering the CSI. Continuing with the example where CSI feedback is provided by a UE to a corresponding base station, the UE may encode the CSI with a CSI encoder using neural-network based channel compression. When the CSI is encoded with an assumption that side information is to be used by the base station in decoding the CSI, the UE may additionally or alternatively provide information regarding which reference signal (e.g., which SRS) the CSI encoded payload is based upon.

Figure 3:
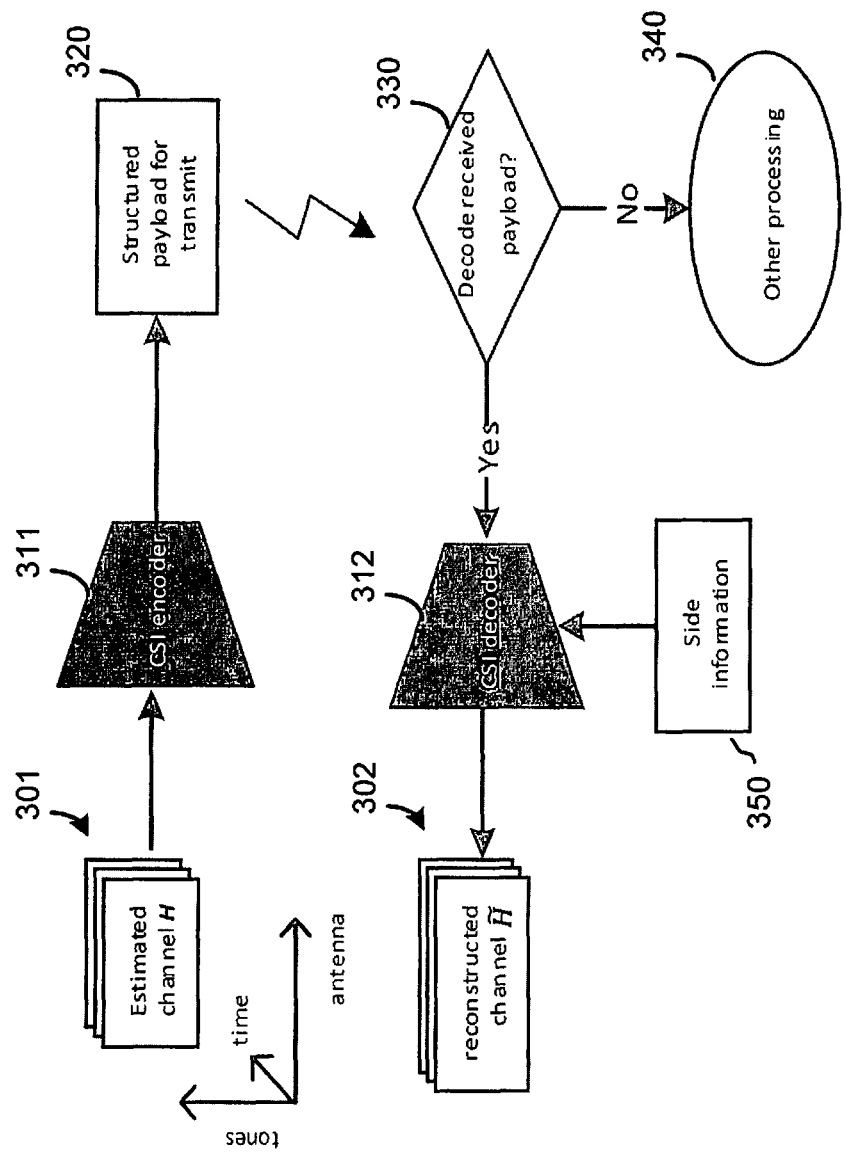
FIG. 3 is a block diagram conceptually illustrating an example implementation configured to provide CSI feedback according to some embodiments of the present disclosure.

Having broadly described CSI feedback according to aspects of the disclosure, further details with respect to example implementations are provided with reference to FIG. 3. The example implementation illustrated in FIG. 3 may operate to provide CSI feedback using NN based channel compression and reconstruction in accordance with concepts of the present disclosure. In particular, FIG. 3 shows CSI encoder 311 and corresponding CSI decoder 312 configured to provide robust CSI feedback, such as, for example, using NN based channel compression and reconstruction as described herein. For example, CSI encoder 311 and CSI decoder 312 of embodiments implement channel compression/reconstruction based upon NN training of the collected channels, wherein the NN based compression and reconstruction is optimized for the channel, or otherwise tailored for the channel conditions, and enables feedback of robust CSI information.

CSI encoder 311 may be implemented by one or more network nodes of wireless network 100 (e.g., ones of base stations 105 and/or UEs 115). The CSI encoder may provide CSI feedback to a corresponding network node of a communication link in the wireless network 100. In accordance with some embodiments, CSI encoder 311 may comprise logic or computer instructions (e.g., program code, such as may be stored by a respective one of memories 242 and 282) executed by, and/or other circuitry (e.g., integrated circuits) of, a network node transmit processor (e.g., transmit processor 220 of base station 105, transmit processor 264 of UE 115, etc.) configured to provide operation as described herein. CSI encoder 311 of embodiments may operate under control of a network node controller/processor (e.g., controller/processor 240, controller/processor 280, etc.) in providing one or more functions of CSI feedback according to aspects of the disclosure.

CSI decoder 312 may be implemented by one or more network nodes of wireless network 100 (e.g., ones of base stations 105 and/or UEs 115). The CSI decoder may receive CSI feedback from a corresponding network node of a communication link in the wireless network 100. In accordance with some embodiments, CSI decoder 312 may comprise logic or computer instructions (e.g., program code, such as may be stored by a respective one of memories 242 and 282) executed by, and/or other circuitry (e.g., integrated circuits) of, a network node transmit processor (e.g., transmit processor 220 of base station 105, transmit processor 264 of UE 115, etc.) configured to provide operation as described herein. CSI decoder 312 of embodiments may operate under control of a network node controller/processor (e.g., controller/processor 240, controller/processor 280, etc.) in providing one or more functions of CSI feedback according to aspects of the disclosure.

CSI encoder 311 and CSI decoder 312 may be trained in a variety of manners. A few examples include offline and/or online with respect to wireless communication services within the wireless network and/or based on an autoencoder (i.e., an artificial NN used to learn data codings in an unsupervised manner) framework in machine learning. For example, a recurrent NN (e.g., using long short-term memory (LSTM)/gated recurrent unit (GRU) units) may be utilized to determine parameters used to encode/decode channel over time for higher efficiency. The neural-network of the autoencoder framework may, for example, be implemented by one or more processors (e.g., controller/processor 240, receiving processor 238, and/or transmit processor 220 of base station 105, controller processor 280, receiving processor 258, and/or transmit processor 264 of UE 115, etc.) implementing functionality as described herein to determine encode and/or decode parameters used with respect to channel compression and reconstruction of aspects of the disclosure. The channel according to aspects of the disclosure is multi-dimensional (tone, antennas, and time as a time series). Encoder/decoder parameters may be derived using NN analysis of embodiments are provided with respect to the multiple dimensions of the channel.

Various network nodes may be involved in encoding and decoding operations. In an example procedure of an autoencoder framework operable for CSI encoder/decoder training based on online data collection at a first network node (e.g., base station 105), a second network node (e.g., UE 115) has CSI-RS observations (e.g., observations based upon the second network node monitoring a RS, such as a CSI-RS, transmitted by the first network node). The second network node may utilize the CSI-RS observations to train instances of CSI encoder 311 and/or CSI decoder 312 implemented by the second network node for channel compression. In operation of the training procedure according to aspects of the disclosure, the second network node sends decoder parameters (e.g., derived from the RS observations) to the first network node and further sends compressed CSI-RS (e.g., compressed using CSI encoder 311 implementing the encoder parameters derived from the RS observations) to the first network node. The first network node has the RS, as transmitted by the first network node for observation by the second network node, and is operable to reconstruct the CSI-RS. Reconstruction may occur using CSI decoder 312 implementing the decoder parameters provided by the second network node. Using this CSI-RS and also the SRS as side information, the first network node trains instances of CSI encoder 311 and/or CSI decoder 312 implemented by the first network node for channel compression. The first network node provides new CSIRS-based CSI encoder parameters to the second network node for use in channel compression with respect to CSI feedback according to aspects of the disclosure.

Reference signals may also play a role in encoding/decoding operations in various aspects. In an example procedure of an autoencoder framework operable for CSI encoder/decoder training based on online data collection at the second network node (e.g., UE 115), the first network node (e.g., base station 105) has RS observations (e.g., observations based upon the second network node transmitted RS, such as a SRS) transmitted by the second network node. The first network node may utilize the RS observations to train instances of CSI encoder 311 and/or CSI decoder 312 implemented by the first network node for channel compression. In operation of the training procedure according to aspects of the disclosure, the first network node sends the decoder parameters derived from the RS observations to the second network node and further sends compressed RS (e.g., compressed using CSI encoder 311 implementing the encoder parameters derived from the RS observations) to the second network node. The second network node is operable to reconstruct the RS using CSI decoder 312 implementing the decoder parameters provided by the first network node and has the observed RS. Using this RS information as side information and also the CSI-RS observations, the second network node trains instances of CSI encoder 311 and/or CSI decoder 312 implemented by the second network node for channel compression. The second network node provides the new CSIRS-based decoder parameters to the first network node for use in channel reconstruction with respect to CSI feedback according to aspects of the disclosure.

Training of CSI encoder 311 and CSI decoder 312 is implemented relatively infrequently by embodiments. For example, training procedures, such as the above example procedures, may be implemented as part of an initial deployment process and/or in response to various changes in the channel or wireless environment (e.g., change of seasons due to deciduous foliage, changes in the cityscape features, changes in terrain, appreciable increase/decrease in interference, etc.). Additionally or alternatively, training procedures may be implemented periodically (e.g., particular times of the day/night, during periods of low communication traffic, each day, week, month, etc.). Irrespective of the particular frequency at which training is implemented, after training the encoder and/or decoder parameters are distributed to network nodes for use in channel compression according to aspects of the disclosure. Encoder and/or decoder parameters may be pre-programed (or stored) in CSI encoder 311 and/or CSI decoder 312 of embodiments. Additionally or alternatively, encoder and/or decoder parameters may be distributed over the air to CSI encoder 311 and/or CSI decoder 312 according to embodiments.

Irrespective of how, and the frequency at which, the network nodes obtain encoder and/or decoder parameters, the CSI encoders and decoders (e.g., CSI encoder 311 and CSI decoder 312) of embodiments utilize the parameters for channel compression with respect to CSI feedback. For example, for each CSI feedback instance, a network node (e.g., UE 115) may provide feedback of payload based on CSI-RS observations to a corresponding network node of a communication link in wireless network 100. For example, estimated channel information 301 (e.g., CSI comprising a channel estimation based upon the network node monitoring a SRS transmitted by another network node) may be encoded by an instance of CSI encoder 311 implemented by UE 115 and utilizing the above described encoder parameters (e.g., implementing neural-network based channel compression) to provide size reduced CSI encoded payload (e.g., CSI encoded payload of structured payload 320) as feedback to a corresponding base station 105. Estimated channel information 301 of embodiments may be generated by logic of one or more processors of a network node (e.g., controller/processor 240, receiving processor 238, and/or transmit processor 220 of base station 105, controller processor 280, receiving processor 258, and/or transmit processor 264 of UE 115, etc.) based upon analysis of an observed RS (e.g., a SRS transmitted by a corresponding network node to which CSI feedback is to be provided).

Figure 4:
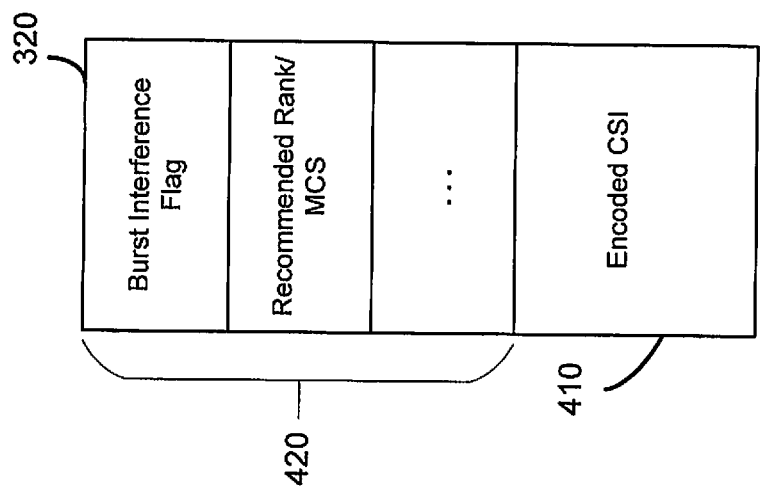
FIG. 4 is a block diagram conceptually illustrating a structured payload configuration according to some embodiments of the present disclosure.

A structured payload, such as structured payload 320, is utilized with respect to CSI feedback according to aspects of the disclosure. Structured payload 320 of embodiments can include uninterpretable payload portion 410 and interpretable payload portion 420, as shown in FIG. 4. One or more configurations for the particular structure of structured payload 320, the type of information carried in the respective portions of the structured payload, the form and format of the information carried by the structured payload may be defined in a communication standard implemented by network nodes of wireless network 100, may be predefined by an operator or network manager, etc.

In accordance with aspects of the disclosure, uninterpretable payload portion 410 of structured payload 320 may be utilized to carry CSI encoded payload (e.g., full or partial CSI information of estimated channel information 301). For example, full or partial estimated channel information 301 may be encoded by an instance of CSI encoder 311 and provided as payload of uninterpretable payload portion 410. Uninterpretable payload portion 410 may comprise information in addition to or in the alternative to encoded CSI, such as control information (e.g., ACK/NACK, random access procedure messages, resource requests, etc.). Signaling may be used to indicate that structured payload 320 is to be utilized with respect to CSI feedback. For example, a network node that is to receive CSI feedback (e.g., base station 105) may provide signaling (e.g., as part of control channel information) to a corresponding network node that is to provide CSI feedback (e.g., UE 115) using structured payload 320. The signaling may, for example, comprise a bitmap for a list of items (e.g., when one bit is on, it means that item needs to be included in the structured payload), such as to facilitate a flexible structured payload implementation that can be changed based on the needs of a network node (e.g., base station 105). Where a plurality of structured payload configurations are utilized, the signaling may indicate a particular configuration of structured payload to be implemented.

Interpretable payload portion 420 of structured payload 320 may be utilized to reduce reconstruction time with respect to the encoded payload of uninterpretable payload portion 410. Channel reconstruction can take appreciable time, and thus interpretable payload may be utilized according to aspects of the disclosure in helping to make early decisions with respect to decoding and/or utilization of reconstructed channel information by CSI decoder 312. For example, when burst interference is experienced on reference signal, the network node receiving the CSI feedback may decide not to decode current CSI. As another example, the network node providing the CSI feedback may provide information, such as recommended rank and/or modulation and coding scheme (MCS), utilized by the decoder when decoding the encoded CSI (e.g., base station 105 receiving the CSI feedback may utilize information, such as recommended rank and/or MCE to start to prepare PDSCH payload early). Interpretable payload portion 420 of structured payload 320 provided by CSI encoder 311 of embodiments may thus include a burst interference flag (e.g., to indicate burst interference experienced on an observed reference signal (RS)), one or more recommended parameters (e.g., rank and/or modulation and coding scheme (MCS)), information regarding which reference signal (e.g., which SRS) the CSI encoded payload is based upon, etc.

Structured payload 320 utilized according to embodiments of the disclosure may be generated using various techniques. In accordance with one generation technique, all payload (i.e., payload of uninterpretable payload portion 410 and payload of interpretable payload portion 420) is generated directly by CSI encoder 311. In accordance with another generation technique, CSI encoder 311 generates only uninterpretable payload of structured payload 320.

In an example generation technique, the interpretable payload and the uninterpretable payload of structured payload 320 are generated directly by CSI encoder 311. In such a generation technique, the interpretable payload may be determined, set, or otherwise established at training. As an example, the encoder/decoder may be trained based on a loss that combines the channel reconstruction and also the interpretable information in the payload according to the following:

$$\text{Loss} = |(|H - H^{\wedge'}|)|^{\wedge}2 + \lambda |d - d'|).$$

Where H and H^' are the input and output of the NN, d and d' are the genie and predicted interpretable information in the payload, and λ is a parameter that balances the loss from both sources. This interpretable payload may later be directly provided by the encoder when generating structure payload 320. Generation techniques where the interpretable payload and the uninterpretable payload are generated directly by the CSI encoder may operate more efficiently than techniques in which the interpretable payload is added to uninterpretable payload generated by the CSI encoder.

In another example generation technique, the uninterpretable payload of structured payload 320 is generated directly by CSI encoder 311 without the CSI encoder generating the interpretable payload. The interpretable payload may, for example, be added to structured payload 320 after the CSI encoding. In accordance to aspects of the disclosure implementing such a generation technique, payload of interpretable payload portion 420 may be generated by a NN or a classical approach (e.g., the UE calculates post MMSE SNR based on CSI-RS observation and this SNR is used to derive the recommended MCS, rank, PMI, etc., wherein this information may be added as interpretable payload portion based on needs).

In operation according to the example of FIG. 3, estimated channel information 301 is received by a network node as CSI encoded payload (e.g., included in structured payload 320). The received payload may be analyzed (e.g., by determination logic 330 executed by one or more processors, such as receive processor 238 and/or controller/processor 240 of base station 105, receive processor 258 and/or controller processor 280 of UE 115, etc.) to determine if the payload comprises channel compression with respect to CSI feedback, and thus is to be decoded using CSI decoder 312. Determination logic 330 of embodiments may additionally or alternatively analyze various signaling (e.g., signaling indicating that structured payload is to be utilized with respect to CSI feedback, indicating that CSI encoded payload is encoded with or without regard to side information, etc.) Where it is determined that the received payload does not comprise channel compression with respect to CSI feedback, processing 340 providing processing other than decoding of CSI feedback by CSI decoder 312 may be performed. However, where it is determined that the received payload does comprise channel compression with respect to CSI feedback, the CSI encoded payload may be decoded by an instance of CSI decoder 312 implemented by base station 105, utilizing the above described decoder parameters, to provide reconstructed channel information 302 (e.g., CSI as feedback by a corresponding UE 115).

In accordance with some aspects of the disclosure, CSI decoder 312 may utilize side information 350 for facilitating channel reconstruction. As an example, CSI decoder 312 of a network node (e.g., base station 105) may utilize information regarding a RS (e.g., SRS) observed by the network node that has been transmitted by the corresponding network node (e.g., UE 115) that provides CSI feedback, in decoding CSI encoded payload to provide reconstructed channel information 302. When the RS information is not completely outdated, CSI decoder 312 of embodiments can use this information as side information 350 for channel reconstruction, and thus the CSI encoded payload (e.g., payload of uninterpretable payload portion 410) can be reduced significantly as compared when this side information is not available (e.g., for TDD the CSI feedback can approach or equal zero using the side information; for FDD, the amount of CSI feedback can be different based on settings). For example, in TDD operation, the downlink and uplink channels have a strong correlation. Channel reciprocity is to say that DL (CSI-RS)/UL (SRS) channel is highly correlated, or the same after some calibrations. Accordingly, for TDD operation, CSI payload (or payload can be compressed to 0) is ideally not needed to recover the channel in situations where the side information is available and not outdated. However, ideal channel reciprocity and/or imperfect side information may not be available, resulting in the use of some reduced CSI payload in association with the side information for the reciprocal channel according to aspects of the disclosure. Accordingly, channel reciprocity can be utilized to recover the downlink or uplink channel based on information regarding the corresponding uplink/downlink channel. In FDD operation, some fading parameters (e.g., SNR, shadowing, certain multipath, channel correlation, etc.) can be related between the downlink and uplink channels. These fading parameters may be used implicitly by the encoder/decoder training, such as when the downlink and uplink shares similar fading parameters the NN determines a way to reuse (in SRS side information) for helping recover the channel. Accordingly, related fading parameters can be utilized to facilitate channel recovery.

Side information 350 utilized according to embodiments may be generated in various ways. For example, in accordance with aspects of the disclosure, side information 350 may be generated by a NN (e.g., implemented by one or more processors, such as controller/processor 240, receiving processor 238, and/or transmit processor 220 of base station 105, controller processor 280, receiving processor 258, and/or transmit processor 264 of UE 115, etc.), such as using RS estimated channel as an input to generate low dimensional information as input to CSI decoder. Logic (e.g., logic of the above mentioned NN) utilized with respect to side information 350 may additionally or alternatively be utilized to align the timing of the received SRS and the received CST payload.

Signaling may be used to indicate that side information 350 is and/or is not to be utilized with respect to CSI feedback. For example, a network node that is to utilize side information 350 in decoding CSI feedback (e.g., base station 105) may provide signaling (e.g., as part of control channel information) to a corresponding network node that is to provide the CSI feedback (e.g., UE 115). In accordance with some aspects, side information signaling may be provided in the downlink control information (DCI) in an implementation where the base station controls the behavior. Additionally or alternatively, a UE may provide side information signaling (e.g., in an uplink control information or as part of interpretable payload) to the base station to indicate that the compressed payload is with/without side information. When side information is indicated as being used by CSI decoder 312 of the network node receiving the CSI feedback, the CSI encoded payload provided by CSI encoder 311 can be reduced as compared to CSI encoded payload provided without the use of side information.

Whether side information is utilized or not, CSI decoder 312 of embodiments operates to provide reconstructed channel information 302 from CSI encoded payload. For example, when a UE is providing feedback of CSI to a base station, reconstruction of a downlink channel may be provided at the base station by reconstructed channel information 302. Similarly, when a base station is providing feedback of CSI to a UE, reconstruction of an uplink channel may be provided at the UE by reconstructed channel information 302. Using the size reduced CSI encoded payload according to aspects of the disclosure, a network node (e.g., base station 105, UE 115, etc.) is enabled to obtain robust CSI (e.g., full CSI, partial CSI information, or CSI feedback that is otherwise not quantized). Reconstructed channel information 302 of embodiments may be utilized by one or more processors of a network node (e.g., controller/processor 240, receiving processor 238, and/or transmit processor 220 of base station 105, controller processor 280, receiving processor 258, and/or transmit processor 264 of UE 115, etc.) to provide an excellent, accurate, representation of a channel (e.g., comprising full information regarding the channel) between network nodes, such as for use in precoding signals for transmission of one or more signals through the channel.

FIGS. 5 and 6 show flow diagrams of operation to provide channel state information feedback according to aspects of the disclosure. In particular, FIG. 5 shows example operation with respect to a network node (e.g., base station 105 or UE 115) configured to receive CSI encoded payload according to embodiments. FIG. 6 shows example operation with respect to a corresponding network node (e.g., UE 115 or base station 105) configured to transmit CSI encoded payload according to embodiments.

Flow 500 of the embodiment illustrated in FIG. 5 sets forth operation by a first network node configured to receive CSI encoded payload from a second network node according to some aspects of the disclosure. At block 501 of flow 500, encoded CSI included in an uninterpretable payload portion of a structured payload including an interpretable payload portion that is interpretable without decoding and the uninterpretable payload portion that is uninterpretable without decoding is received. For example, the first network node (e.g., base station 105 or UE 115) may receive structured payload including the encoded CSI from the second network node (e.g., UE 115 or base station 105) of wireless network 100. The interpretable payload portion may comprise information configured to facilitate early decisions by the first network node with respect to decoding the encoded CSI or utilization of the reconstructed channel information, such as burst interference information, recommended rank information, MCS information, information regarding which reference signal encoding of the encoded CSI is based upon, etc. The encoded CSI of the uninterpretable payload portion may, for example, comprise information regarding a reference signal observed by the second network node that is compressed by a CSI encoder using neural-network based channel compression, wherein the CSI information is information regarding the estimated channel other than quantized parameters determined from information regarding the estimated channel as observed by the second network node. In accordance with some aspects of the disclosure, the encoded CSI of the uninterpretable payload portion comprises full CSI information regarding an estimated channel as observed by the second network node. The encoded CSI in the uninterpretable payload portion according to some aspects is reduced in size based on an assumption or understanding that RS based side information is to be utilized in decoding the encoded CSI. The first network node may, according to some aspects of the disclosure, provide signaling to the second network node indicating that the structured payload is to be used for feedback of the encoded CSI.

At block 502, a reference signal is received. For example, the first network node may receive a reference signal from the second network node. The reference signal of embodiments may comprise a SRS or other reference signal transmitted by the second network node suitable for generating side information utilized by the first network node in decoding the encoded CSI. In accordance with some aspects of the disclosure, the first network node may provide signaling to the second network node indicating that the encoded CSI of the uninterpretable payload portion is to be encoded with consideration of the RS based side information. Additionally or alternatively, the second network node may provide signaling to the first network node indicating which reference signal (e.g., which SRS) the CSI encoded payload is based upon.

RS based side information is generated using the RS at block 503 of flow 500. For example, the first network node may generate the RS based side information from the RS received from the UE by inputting a RS estimated channel to a neural-network to generate low dimensional information for the RS based side information.

At block 504, the CSI from the uninterpretable payload portion is decoded using information from the interpretable payload portion and the RS based side information to provide reconstructed channel information. For example, the RS based side information may be input to a CSI decoder of the first network node for decoding the encoded CSI of the uninterpretable payload portion. The CSI decoder of the first network node may additionally or alternatively be operated to utilize information, such as burst interference information, of the interpretable payload portion to determine if decoding of the encoded CSI is to be performed. The CSI decoder may similarly utilize information, such as which reference signal the CSI encoded payload is based upon, of the interpretable payload portion may be used in providing the RS based side information for the CSI decoder of the first network node decoding the encoded CSI.

Flow 600 of the embodiment illustrated in FIG. 6 sets forth operation by a first network node configured to transmit CSI encoded payload to a second network node according to some aspects of the disclosure. At block 601 of flow 600, a RS is transmitted. For example, the first network node (e.g., UE 115 or base station 105) may transmit a reference signal to the second network node (e.g., base station 105 or UE 115) of wireless network 100. The reference signal of embodiments may comprise a SRS or other reference signal suitable for generating side information utilized by the second network node in decoding the encoded CSI. In accordance with some aspects of the disclosure, the first network node may receive signaling from the second network node indicating that the encoded CSI of the uninterpretable payload portion is to be encoded with consideration of RS. Additionally or alternatively, the first network node may provide signaling to the second network node indicating which reference signal (e.g., which SRS) the CSI encoded payload is based upon.

At block 602, CSI is encoded to provide encoded CSI, wherein the encoded CSI is reduced in size based on the RS. For example, the encoded CSI may, for example, comprise information regarding a reference signal observed by the first network node that is compressed by a CSI encoder using neural-network based channel compression, wherein the CSI information is information regarding the estimated channel other than quantized parameters determined from information regarding the estimated channel as observed by the first network node. In accordance with some aspects of the disclosure, the encoded CSI comprises full CSI information regarding an estimated channel as observed by the first network node. The encoded CSI in the uninterpretable payload portion according to some aspects is reduced in size based on an assumption or understanding that RS based side information is to be utilized in decoding the encoded CSI. In accordance with some aspects of the disclosure, the first network node may receive signaling from the second network node indicating that the encoded CSI of the uninterpretable payload portion is to be encoded with consideration of the RS signal. Additionally or alternatively, the first network node may provide signaling to the second network node indicating which reference signal (e.g., which SRS) the CSI encoded payload is based upon.

The encoded CSI is transmitted in an uninterpretable portion of a structured payload including an interpretable payload portion that is interpretable without decoding and the uninterpretable payload portion that is uninterpretable without decoding, at block 603. For example, the first network node may transmit structured payload including the encoded CSI to the second network node. The first network node may, according to some aspects of the disclosure, receive signaling from the second network node indicating that the structured payload is to be used for feedback of the encoded CSI. The interpretable payload portion may comprise information configured to facilitate early decisions by the second network node with respect to decoding the encoded CSI or utilization of the reconstructed channel information, such as burst interference information, recommended rank information, MCS information, information regarding which reference signal encoding of the encoded CSI is based upon, etc. The uninterpretable payload portion of the structured payload comprises the encoded CSI according to aspects of the disclosure.

FIGS. 5 and 6 discussed above show flow diagrams illustrating example blocks executed to implement aspects of the present disclosure. The example blocks will also be described with respect to base station 105 as illustrated in FIG. 7 and UE 115 as illustrated in FIG. 8.

Figure 7:
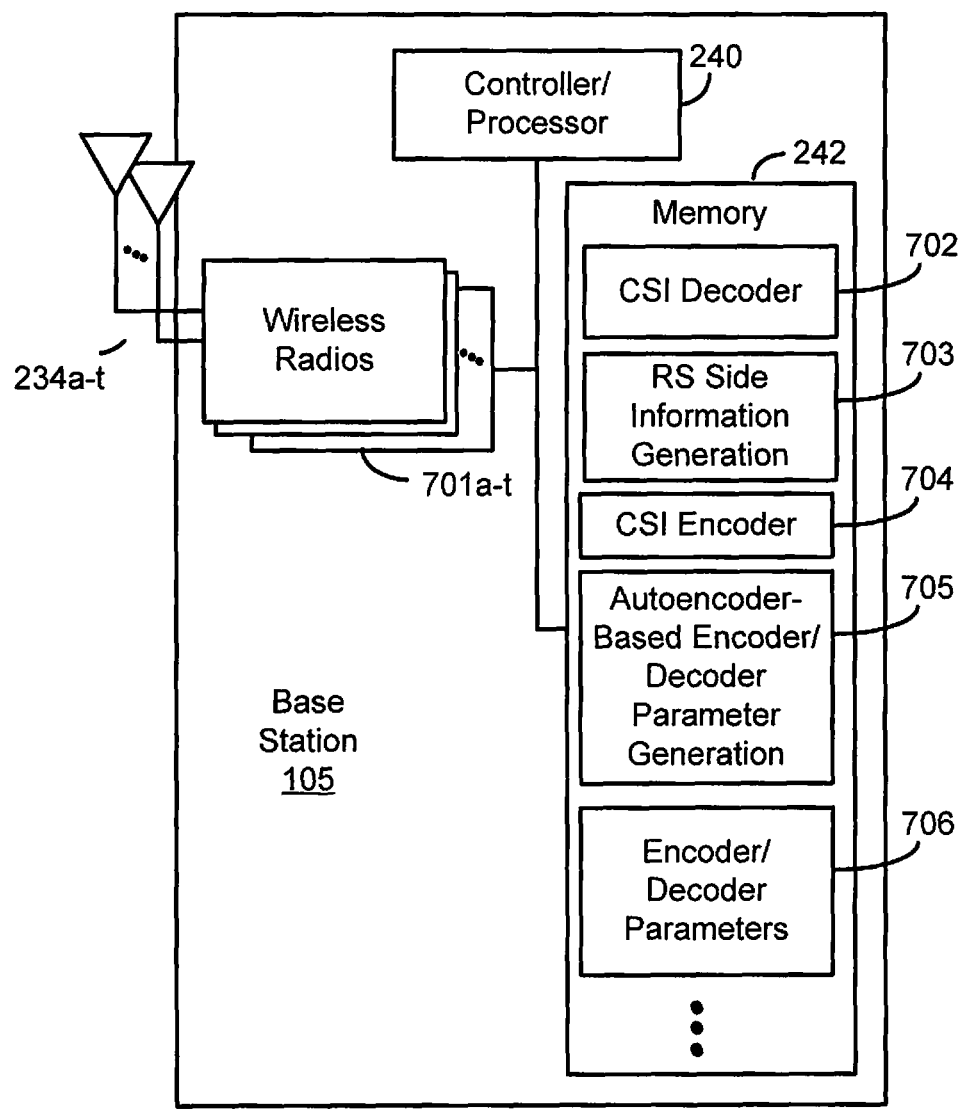
FIG. 7 is a block diagram conceptually illustrating a design of a base station configured for CSI feedback according to some embodiments of the present disclosure.

FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701*a-t* and antennas 234*a-t*. Wireless radios 701*a-t* include various components and hardware, as illustrated in FIG. 2 for base station 105, including modulator/demodulators 232*a-t*, MIMO detector 236, receive processor 238, transmit processor 220, and TX MIMO processor 230. Base station 105 is configured to provide operation to receive encoded CSI and provide channel reconstruction, such as according to flow 500 of FIG. 5, through utilization of CSI decoder logic 702 (implementing parameters of encoder/decoder parameters 706) and RS side information generation logic 703 operable to provide functions as described above. Additionally or alternatively, base station 105 is configured to provide operation to transmit encoded CSI, such as according to flow 600 of FIG. 6, though utilization of CSI encoder logic 704 (implementing parameters of encoder/decoder parameters 706) operable to provide functions as described above. Autoencoder-based encoder/decoder parameter generation logic 705, such as may comprise an artificial NN used to learn efficient data codings, may be operable to provide generation of encoder/decoder parameters 706 utilized by CSI decoder logic 702 and/or CSI encoder logic 704.

Figure 8:
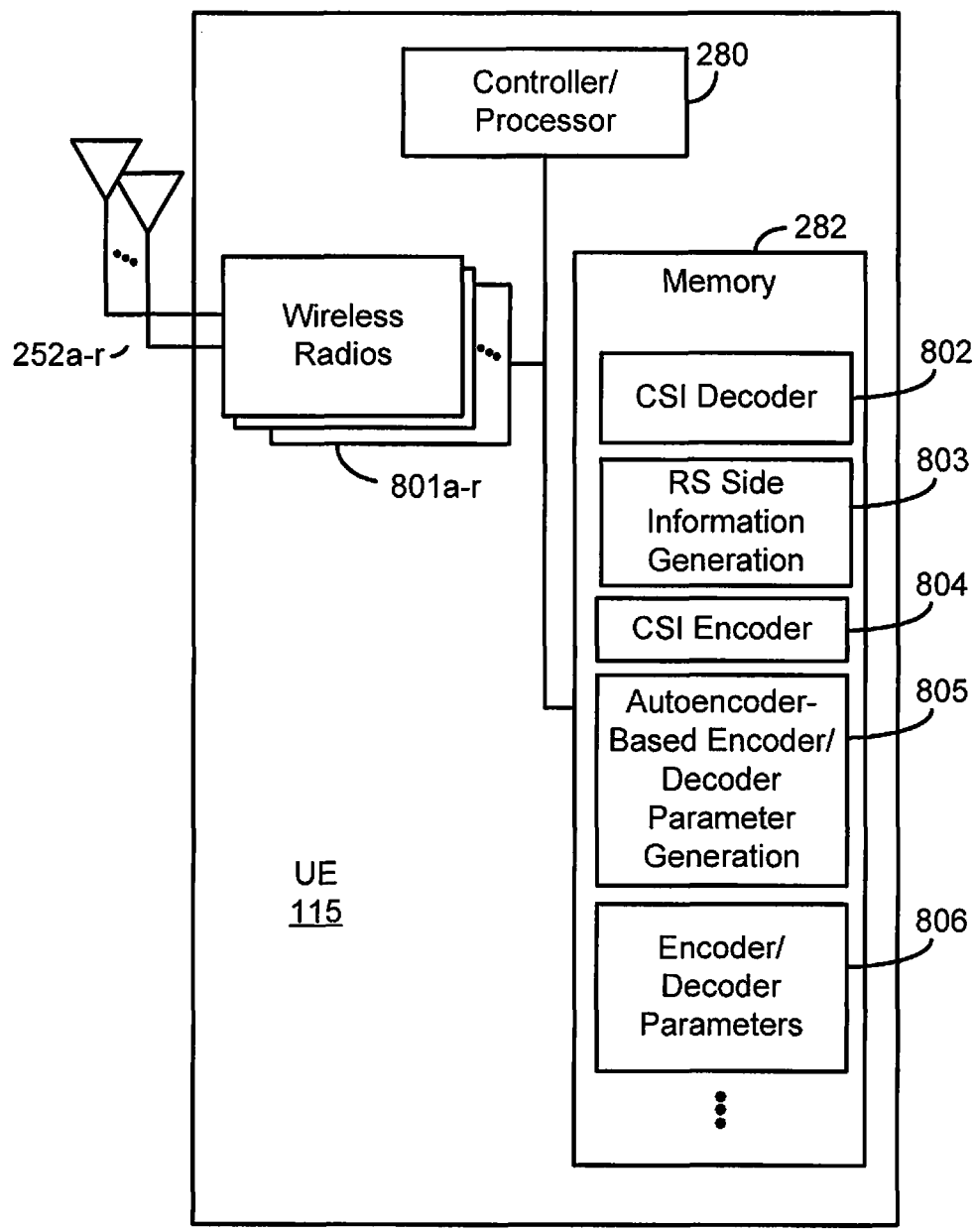
FIG. 8 is a block diagram conceptually illustrating a design of a UE configured for CSI feedback according to some embodiments of the present disclosure.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r include various components and hardware, as illustrated in FIG. 2 for UE 115, including modulator/demodulators 254a-r, MIMO detector 256, receive processor 258, transmit processor 264, and TX MIMO processor 266. UE 115 is configured to provide operation to transmit encoded CSI, such as according to flow 600 of FIG. 6, though utilization of CSI encoder logic 804 (implementing parameters of encoder/decoder parameters 806) operable to provide functions as described above. Additionally or alternatively, UE 115 is configured to provide operation to receive encoded CSI and provide channel reconstruction, such as according to flow 500 of FIG. 5, through utilization of CSI decoder logic 802 (implementing parameters of encoder/decoder parameters 806) and RS side information generation logic 803, operable to provide functions as described above. Autoencoder-based encoder/decoder parameter generation logic 805, such as may comprise an artificial NN used to learn efficient data codings, may be operable to provide generation of encoder/decoder parameters 806 utilized by CSI decoder logic 802 and/or CSI encoder logic 804.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating feedback of encoded CSI may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5 and 6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a first network node from a second network node, encoded channel state information (CSI) included in an uninterpretable payload portion of a structured payload including an interpretable payload portion that is interpretable without decoding and the uninterpretable payload portion that is uninterpretable without decoding;
   generating, by the first network node, reference signal (RS) based side information, based at least partially on a RS, wherein the RS based side information is in addition to the CSI that is configured for use in association with the CSI; and
   decoding, by the first network node, the encoded CSI from the uninterpretable payload portion using information from the interpretable payload portion and the RS based side information to provide reconstructed channel information.

2. The method of claim 1, further comprising:
   signaling, by the first network node to the second network node, to indicate that the second network node is to use the structured payload for feedback of the encoded CSI.

3. The method of claim 1, further comprising:
   signaling, by the first network node to the second network node, to indicate that the second network node is to encode CSI of the uninterpretable payload portion based at least partially on the RS based side information.

4. The method of claim 1, further comprising:
   inputting a RS estimated channel to a neural-network to generate dimensional information for the RS based side information provided to a CSI decoder decoding the reconstructed channel information from the encoded CSI of the uninterpretable payload portion.

5. The method of claim 1, wherein the encoded CSI in the uninterpretable payload portion comprises CSI encoded by a CSI encoder using neural-network based channel compression.

6. The method of claim 5, wherein the encoded CSI in the uninterpretable payload portion is encoded based on the RS based side information.

7. The method of claim 1, wherein the encoded CSI in the uninterpretable payload portion comprises CSI information defining an estimated channel associated with the second network node.

8. The method of claim 1, wherein the interpretable payload portion comprises information configured to facilitate early decisions by the first network node with respect to decoding the encoded CSI or utilization of the reconstructed channel information.

9. The method of claim 8, wherein the information of the interpretable payload portion includes at least one of burst interference information, recommended rank information, modulation and coding scheme (MCS) information, or information regarding which reference signal encoding of the encoded CSI is based upon.

10. The method of claim 1, further comprising:
    training a CSI decoder configured to perform the decoding of the encoded CSI from the uninterpretable payload portion using an autoencoder framework based on online data collection at the first network node, wherein the online data collection includes CSI information collected from the second network node and reference signal information monitored by the first network node, and wherein the encoded CSI in the uninterpretable payload portion is compressed using encoder parameters derived from the autoencoder framework.

11. The method of claim 10, wherein both the interpretable payload portion and the uninterpretable payload portion are generated by a CSI encoder, wherein the CSI encoder has been trained using the autoencoder framework used in training the CSI decoder.

12. The method of claim 10, wherein the uninterpretable payload portion is generated by a CSI encoder and the interpretable payload portion is added to the structured payload after encoding of the uninterpretable payload portion by the CSI encoder.

13. A method of wireless communication, comprising:
    transmitting, by a first network node, a reference signal (RS);
    encoding, by the first network node, channel state information (CSI) to provide encoded CSI, wherein the encoded CSI is based at least partially on the RS; and
    transmitting, by the first network node to a second network node, the encoded CSI in an uninterpretable payload portion of a structured payload including an interpretable payload portion that is interpretable without decoding and the uninterpretable payload portion that is uninterpretable without decoding.

14. The method of claim 13, further comprising:
    receiving, by the first network node from the second network node, an indication that the first network node is to use the structured payload with respect to the encoded CSI.

15. The method of claim 13, further comprising:
    signaling, by the first network node to the second network node, to indicate that the first network node is using the structured payload for feedback of the encoded CSI.

16. The method of claim 13, further comprising:
receiving, by the first network node from the second network node, an indication that the first network node is to encode the CSI with consideration of the RS.

17. The method of claim 13, wherein the RS comprises a sounding reference signal (SRS).

18. The method of claim 13, wherein the encoded CSI in the uninterpretable payload portion comprises information compressed by a CSI encoder using neural-network based channel compression.

19. The method of claim 13, wherein encoded CSI of the uninterpretable payload portion comprises CSI information defining an estimated channel associated with the first network node.

20. The method of claim 13, wherein the interpretable payload portion comprises information configured to facilitate early decisions by the second network node with respect to decoding the encoded CSI or utilization of reconstructed channel information obtained by decoding the encoded CSI.

21. The method of claim 20, wherein the information of the interpretable payload portion includes at least one of burst interference information, recommended rank information, modulation and coding scheme (MCS) information, or information regarding which reference signal encoding of the encoded CSI is based upon.

22. The method of claim 13, further comprising:
training a CSI encoder configured to perform the encoding of the CSI of the uninterpretable payload portion using an autoencoder framework based on online data collected at the first network node, wherein the online data collection includes reference signal observation information and decoder parameters derived from observation of the reference collected from the second network node and CSI reference signal information monitored by the first network node, and wherein the encoded CSI in the uninterpretable payload portion is compressed using encoder parameters derived from the autoencoder framework.

23. The method of claim 22, wherein both the interpretable payload portion and the uninterpretable payload portion are generated by the CSI encoder.

24. The method of claim 22, wherein the uninterpretable payload portion is generated by the CSI encoder and the interpretable payload portion is added to structured CSI feedback channel compression after encoding of the uninterpretable payload portion by the CSI encoder.

25. An apparatus configured for wireless communication, the apparatus comprising:
a memory; and
at least one processor coupled to the memory, wherein the at least one processor is configured:
to receive, by a first network node from a second network node, encoded channel state information (CSI) included in an uninterpretable payload portion of a structured payload including an interpretable payload portion that is interpretable without decoding and the uninterpretable payload portion that is uninterpretable without decoding;
to generate, by the first network node, a reference signal (RS) based side information, based at least partially on a RS, wherein the RS based side information is in addition to the CSI that is configured for use in association with the CSI; and
to decode, by the first network node, the encoded CSI from the uninterpretable payload portion using information from the interpretable payload portion and the RS based side information to provide reconstructed channel information.

26. The apparatus of claim 25, wherein the at least one processor is further configured:
to input a RS estimated channel to a neural-network to generate dimensional information for the RS based side information provided to a CSI decoder decoding the reconstructed channel information from the encoded CSI of the uninterpretable payload portion.

27. The apparatus of claim 25, wherein the interpretable payload portion comprises information configured to facilitate early decisions by the first network node with respect to decoding the encoded CSI or utilization of the reconstructed channel information, wherein the information of the interpretable payload portion includes at least one of burst interference information, recommended rank information, modulation and coding scheme (MCS) information, or information regarding which reference signal encoding of the encoded CSI is based upon.

28. An apparatus configured for wireless communication, the apparatus comprising:
a memory; and
at least one processor, wherein the at least one processor is configured:
to transmit, by a first network node, a reference signal (RS);
to encode, by the first network node, channel state information (CSI) to provide encoded CSI, wherein the encoded CSI is based at least partially on the RS; and
to transmit, by the first network node to a second network node, the encoded CSI in an uninterpretable payload portion of a structured payload including an interpretable payload portion that is interpretable without decoding and the uninterpretable payload portion that is uninterpretable without decoding.

29. The apparatus of claim 28, wherein the interpretable payload portion comprises information configured to facilitate early decisions by the second network node with respect to decoding the encoded CSI or utilization of reconstructed channel information obtained by decoding the encoded CSI, wherein the information of the interpretable payload portion includes at least one of burst interference information, recommended rank information, modulation and coding scheme (MCS) information, or information regarding which reference signal encoding of the encoded CSI is based upon.

30. The apparatus of claim 28, further comprising:
training a CSI encoder configured to perform the encoding of the CSI of the uninterpretable payload portion using an autoencoder framework based on online data collected at the first network node, wherein the online data collection includes reference signal observation information and decoder parameters derived from observation of the reference collected from the second network node and CSI reference signal information monitored by the first network node, and wherein the encoded CSI in the uninterpretable payload portion is compressed using encoder parameters derived from the autoencoder framework.

* * * * *